US007747779B2

(12) United States Patent
Nishio

(10) Patent No.: US 7,747,779 B2
(45) Date of Patent: Jun. 29, 2010

(54) INFORMATION PROCESSING APPARATUS, INFORMATION PROCESSING METHOD, AND MEDIUM STORING THEREIN PROGRAM FOR EXECUTING THE METHOD

(75) Inventor: Masahiro Nishio, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 230 days.

(21) Appl. No.: 11/953,449

(22) Filed: Dec. 10, 2007

(65) Prior Publication Data

US 2008/0101373 A1 May 1, 2008

Related U.S. Application Data

(62) Division of application No. 10/615,303, filed on Jul. 9, 2003, now Pat. No. 7,337,238.

(30) Foreign Application Priority Data

Jul. 12, 2002 (JP) ............................. 2002-204282

(51) Int. Cl.
G06F 15/16 (2006.01)
(52) U.S. Cl. ...................... 709/245; 709/249
(58) Field of Classification Search ................. 709/245, 709/249; 370/230
See application file for complete search history.

(56) References Cited

U.S. PATENT DOCUMENTS

| 6,496,511 | B1 * | 12/2002 | Wang et al. ................. 370/401 |
| 6,625,645 | B1 * | 9/2003 | Van Horne et al. .......... 709/221 |
| 6,732,258 | B1 * | 5/2004 | McGrath et al. ............ 712/211 |
| 6,957,276 | B1 | 10/2005 | Bahl .......................... 709/245 |
| 7,075,932 | B2 * | 7/2006 | Matsuhira et al. ...... 370/395.31 |
| 7,200,677 | B1 * | 4/2007 | Allen et al. ................. 709/245 |
| 2001/0046227 | A1 * | 11/2001 | Matsuhira et al. .......... 370/355 |
| 2002/0062485 | A1 | 5/2002 | Okano ......................... 725/111 |
| 2002/0133573 | A1 | 9/2002 | Matsuda ...................... 709/220 |

(Continued)

FOREIGN PATENT DOCUMENTS

JP 11-053143 2/1999

(Continued)

*Primary Examiner*—Krisna Lim
(74) *Attorney, Agent, or Firm*—Fitzpatrick, Cella, Harper & Scinto

(57) ABSTRACT

An information processing apparatus which can communicate via a network with an external information processing apparatus which issues a disconnection notification based on disconnection from the network is provided with managing means for managing fixed identification information added to the external information processing apparatus and variable identification information added to the external information processing apparatus. The information processing apparatus includes obtaining means for obtaining the fixed identification information and the variable identification information from the external information processing apparatus; discriminating means for discriminating whether the variable identification information obtained by the obtaining means coincides with the variable identification information managed by the managing means and whether the fixed identification information obtained by the obtaining means coincides with the fixed identification information managed by the managing means; and setting means for, if the discriminating means discriminates that, although the fixed identification information obtained by the obtaining means coincides with the fixed identification information managed by the managing means, the variable identification information obtained by the obtaining means does not coincide with the variable identification information managed by the managing means, setting the variable identification information obtained by the obtaining means in a control program that controls the external information processing apparatus having the fixed identification information.

11 Claims, 8 Drawing Sheets

U.S. PATENT DOCUMENTS

| | | | |
|---|---|---|---|
| 2003/0140283 A1 | 7/2003 | Nishio | 714/43 |
| 2004/0230703 A1 | 11/2004 | Sukigara | 709/253 |

FOREIGN PATENT DOCUMENTS

| | | |
|---|---|---|
| JP | 11-282644 | 10/1999 |
| JP | 2000-122944 | 4/2000 |
| JP | 2001-326656 | 11/2001 |
| JP | 2002-094531 | 3/2002 |
| JP | 2002-182919 | 6/2002 |

* cited by examiner

FIG. 3

```
NOTIFY * HTTP/1.1
HOST: 239.255.255.250:1900
CACHE-CONTROL:max-age = 600
LOCATION: 123.222.212.121
NT: Print
NTS: ssdp:alive
SERVER: OS/version UPnP/1.0 product/version <DeviceInfo>
    <PrinterMakeAndModel> XXXXX LBP-1234
    </PrinterMakeAndModel>
    <PrinterName> My Printer
    </PrinterName>
    <PrinterURL> 123.222.212.121
    </PrinterURL>
    <PrinterMACAddress> 00-60-08-01-02-0B
    </PrinterMACAddress>
    <PrinterUUID> 00-60-08-01-02-0B
    </PrinterUUID>
</DeviceInfo>
```

FIG. 4

```
NOTIFY * HTTP/1.1
HOST: 239.255.255.250:1900
CACHE-CONTROL:max-age = 600
LOCATION: 123.222.212.121
NT: Print
NTS: ssdp:byebye
SERVER: OS/version UPnP/1.0 product/version <DeviceInfo>
    <PrinterMakeAndModel> XXXXX LBP-1234
    </PrinterMakeAndModel>
    <PrinterName> My Printer
    </PrinterName>
    <PrinterURL> 123.222.212.121
    </PrinterURL>
    <PrinterMACAddress> 00-60-08-01-02-0B
    </PrinterMACAddress>
    <PrinterUUID> 00-60-08-01-02-0B
    </PrinterUUID>
</DeviceInfo>
```

FIG. 7

M-SEARCH * HTTP/1.1

HOST: 239.255.255.250:1900

MAN: "ssdp:discover"

MX: 60

ST: uuid:00-60-08-95-6C-0B

CONTENT-LENGTH: bytes in body

CONTENT-TYPE: text/xml;charset="utf-8"

INFORMATION PROCESSING APPARATUS, INFORMATION PROCESSING METHOD, AND MEDIUM STORING THEREIN PROGRAM FOR EXECUTING THE METHOD

CROSS-REFERENCE TO RELATED APPLICATIONS

This application is a division of U.S. patent application Ser. No. 10/615,303, filed Jul. 9, 2003, now U.S. Pat. No. 7,337,238, issued Feb. 25, 2008, and claims benefit of the filing date of that application, and priority benefit of the filing date of Japanese Patent Application No. 2002-204282, filed Jul. 12, 2002. The entire disclosure of each of the prior applications is incorporated herein by reference.

BACKGROUND OF THE INVENTION

1. Field of the Invention

The invention relates to an information processing apparatus corresponding to a network, an information processing apparatus for controlling an external information processing apparatus, and a network system including those apparatuses.

2. Related Background Art

In association with the rapid spread of the Internet communication, network corresponding type devices are rapidly being progressed in a manner such that not only the conventional personal computers but also user-interactive devices such as PDA (Personal Digital Assistance), cellular phones, and the like, image processing apparatuses such as scanner, printer, copying apparatus, digital camera, and the like, and household appliances such as television, air-conditioner, refrigerator, and the like are made to correspond to networks.

In association with it, a network connecting procedure of the network corresponding type devices which has hitherto been made by a network administrator has been simplified. Particularly, with respect to IP address setting which is important in Internet protocol (IP) setting, in addition to the conventional manual setting, automatic allocation using a DHCP server or setting by automatic IP address obtaining means (which has been released by a document name "draft-ietf-zeroconf-ipv4-linklocal-01.txt" by IETF) for a network environment such as a SOHO (Small Office/Home Office) environment in which a server cannot be installed has been proposed. The above means is also used in Universal Plug and Play Device Architecture v1.0 proposed by Microsoft Corporation. Thus, the ordinary user can make communication using an IP address of the network corresponding type device mentioned above.

An ARP protocol has also been developed in order to solve problems of LAN addresses. For example, there is a technique such that if a certain peripheral device A broadcasts an IP address of an apparatus with which it wants to communicate to a predetermined network segment, a peripheral device B to which the IP address has been allocated returns a set of an MAC address and the IP address of the peripheral device B, so that the peripheral device A can communicate by using the MAC address after that.

However, there is a case where if the network corresponding type device is equipped with means for automatically obtaining the IP address by using the DHCP server, the automatic IP address obtaining means, or the like, the network corresponding type device executes a process for obtaining the IP address and obtains a different IP address each time the user participates in the network.

Therefore, the user needs to change a network configuration setting of application software, utility software, driver software, or the like for using the network corresponding type device installed into a client device each time he uses such software. There is also a problem such that unless the user uses a software tool or the like of the network, he cannot obtain the latest IP address of the network corresponding type device to be used, or the like. Even if communication is made by using the ARP protocol, an ARP table which each device possesses is not dynamically changed in accordance with a connecting state of a peripheral device as an example of external information processing apparatuses. To make proper communication, the user needs to make a complicated manual setting. As preferred examples of the peripheral devices of the invention, all types of network corresponding type devices are included, and the image processing apparatuses such as scanner, printer, copying apparatus, digital camera, and the like, the household appliances such as television, air-conditioner, refrigerator, and the like, and their hybrid apparatus can be mentioned. The peripheral devices are included in the information processing apparatus of the invention.

The DHCP server grasps the IP address which has been lent to the peripheral device, that is, the IP address of which temporary allocation has been allowed. However, the DHCP server does not have a mechanism for dynamically managing the clients by using the set of the MAC address as an example of fixed identification information which is fixedly allocated to the client and the IP address as an example of variable identification information which is variably allocated to it. The DHCP server is a server for lending the IP address and does not execute a process for discriminating the connecting state of the peripheral device with which it wants to communicate by using the set of the MAC address and the IP address.

When a network system in which a service management server for unitarily managing services is unnecessary is constructed, it is necessary that each device on the network manages network information. In order to enable the device to recognize which device is active on the network in such a network system, a method whereby when the device is disconnected from the network, the devices on the same network are notified of information indicative of its disconnection from the network in a broadcasting manner can be considered. However, at this time, there is a case where the devices on the network cannot normally receive the disconnection notification from the peripheral device to be disconnected from the network, so that a problem occurs. For example, there is a case where the peripheral device causes a system-down without making the disconnection notification or a case where before the disconnection notification from the peripheral device reaches other peripheral devices, another new peripheral device participates in the network and starts communication by using the identification information on the same network as that of the relevant peripheral device.

SUMMARY OF THE INVENTION

The invention is made in consideration of at least one of the above problems and it is an object of the invention to provide an environment in which each device can make proper communication in a network system in which a management server for managing services is unnecessary.

Further another object of the invention is to provide a mechanism such that even in the case where there is no management server for managing services or even in an environment in which a disconnection notification from a network cannot be received from a device, whether a desired communication partner destination has been connected to the network or not and whether identification information allocated to the communication partner destination has been changed or not can be correctly recognized.

According to an embodiment, there is disclosed an information processing apparatus which can communicate with an external information processing apparatus via a network. The information processing apparatus comprises: managing means for managing fixed identification information fixedly added to the external information processing apparatus and variable identification information variably added to the external information processing apparatus; obtaining means for obtaining the fixed identification information and the variable identification information via the network from the external information processing apparatus which can be communicated with; discriminating means for discriminating whether the fixed identification information obtained by the obtaining means coincides with the fixed identification information managed by the managing means or not and whether the variable identification information obtained by the obtaining means coincides with the variable identification information managed by the managing means or not; and changing means for changing a setting of a control program for controlling the external information processing apparatus having the fixed identification information on the basis of the variable identification information obtained by the obtaining means if the discriminating means determines that although the fixed identification information obtained by the obtaining means coincides with the fixed identification information managed by the managing means, the variable identification information obtained by the obtaining means does not coincide with the variable identification information managed by the managing means.

Other features and advantages of the present invention will be apparent from the following description taken in conjunction with the accompanying drawings, in which like reference characters designate the same or similar parts throughout thereof.

BRIEF DESCRIPTION OF THE DRAWINGS

FIG. 3 is a diagram showing a packet format of Notifyssdp: alive;

FIG. 4 is a diagram showing a packet format of Notifyssdp: byebye;

FIG. 7 is a diagram showing a packet format of the device discovery; and

DETAILED DESCRIPTION OF THE PREFERRED EMBODIMENTS

Figure 1:
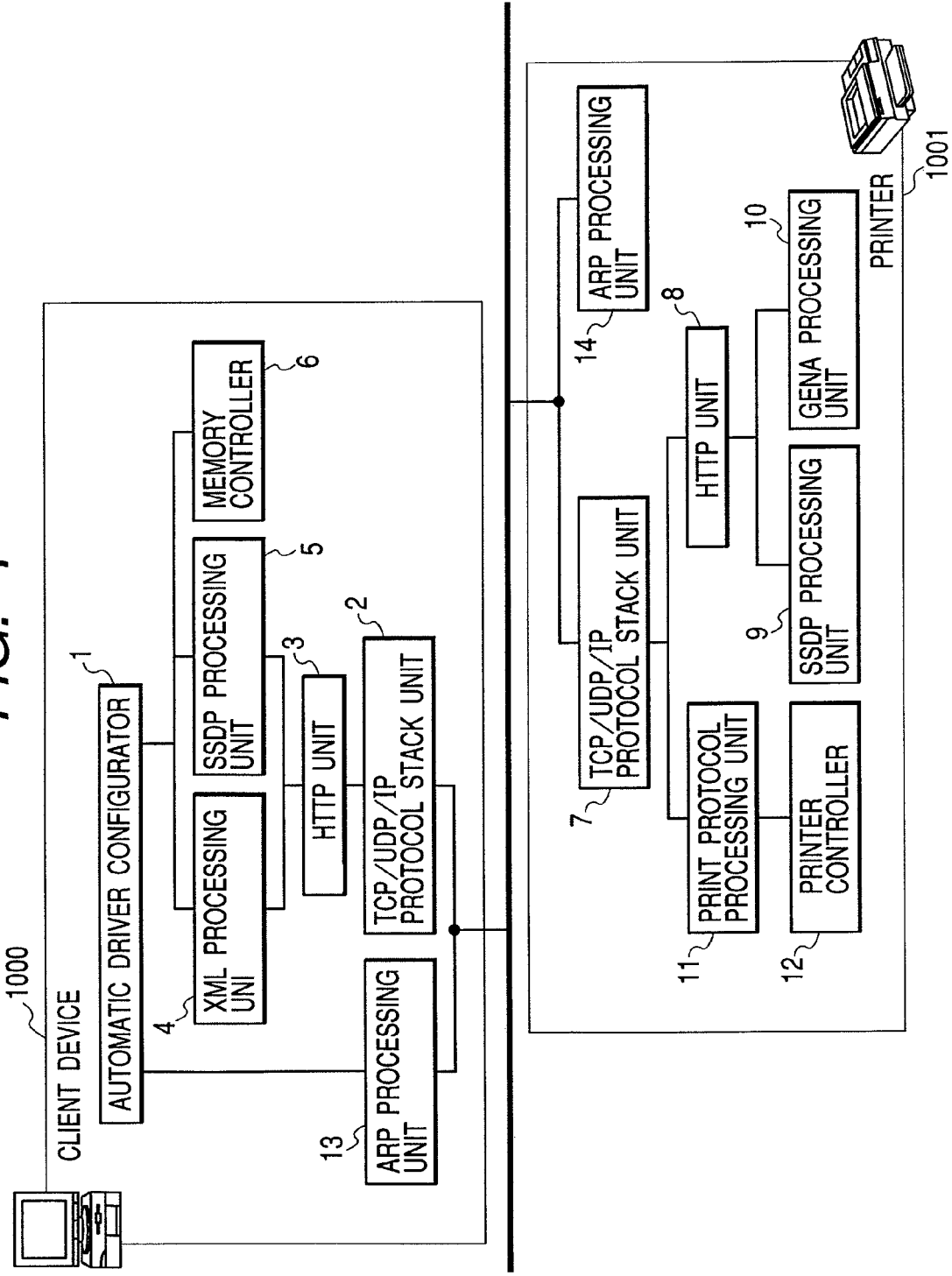
FIG. 1 is a diagram showing an example of a construction of a system for realizing an embodiment of the invention.

FIG. 1 is a diagram showing an example of a construction of a system for realizing an embodiment of the invention. In the embodiment, the system is constructed by: software which is executed on a client device side; and a network corresponding type device, that is, a network corresponding type printer here. Each of them is constructed by each functional module shown in the diagram. Each functional module shown in the diagram is realized by assembling a software module therein by using a standard PC or workstation.

The software which is provided for the client device as a preferred example of an information processing apparatus of the invention is software which operates on an operating system environment in which the client device is operating. This software has: a TCP/UDP/IP protocol stack unit 2 as a communication functional module, and an ARP (Address Resolution Protocol) processing unit 13. An HTTP unit (Hyper Text Transfer Protocol) 3 which conforms with HTTP1.1 is provided as an application layer on the TCP/UDP/IP protocol stack unit 2. An XML (eXtensible Markup Language) processing unit 4 and an SSDP (Simple Service Discovery Protocol) processing unit 5, which will be explained hereinlater, are provided for an upper layer of the application layer.

An Automatic Driver Configurator processing unit (automatic driver setting processing unit) 1 is located in an upper layer of the ARP processing unit 13, XML processing unit 4, SSDP processing unit 5, and a memory controller 6. The Automatic Driver Configurator processing unit 1 executes installation, configuration, and uninstallation of network corresponding type device control software recorded in a storing device which is managed by the client device via the memory controller 6 in accordance with attribute information which is notified by a service providing device. The attribute information notified by the service providing device is similarly recorded into a recording apparatus via the memory controller 6 as memory control means.

In the invention, the network corresponding type device has a TCP/UDP/IP protocol stack unit 7 and an ARP processing unit 14 as a communicating function. An HTTP unit 8 which conforms with HTTP1.1 is provided on the protocol stack.

An SSDP (Simple Service Discovery Protocol) processing unit 9 and a GENA (General Event Notification Architecture) processing unit 10 are provided for an upper layer of the HTTP unit 8. A Print Protocol processing unit 11 is provided on the protocol stack and has a function for analyzing a printer request which is issued from the client device and sending the request to a Printer Controller 12.

Figure 2:
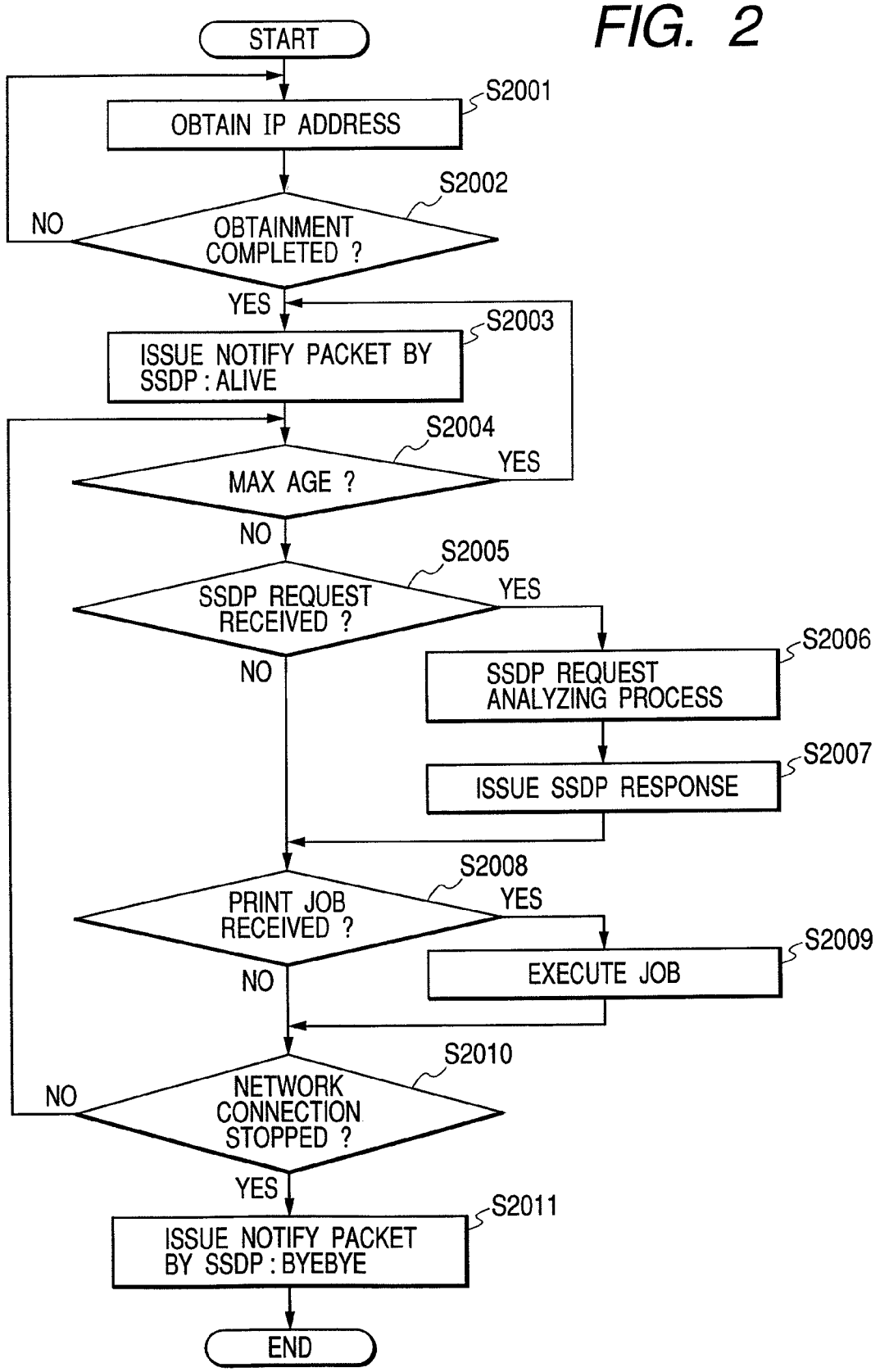
FIG. 2 is a flowchart showing control of a network corresponding type device in the embodiment.

A flow for control of the present system will be described hereinbelow in accordance with flowcharts. FIG. 2 is a diagram showing control of the network corresponding type device in the embodiment. In the invention, after a printer 1001 as a network corresponding type device is activated, it starts processes shown in FIG. 2. After the activation, the printer 1001 automatically tries to obtain the IP address to be used by itself in accordance with one of procedures based on DHCP, BootP, RARP, automatic IP address obtaining method, and the like (which has been released by the document name "draft-ietf-zeroconf-ipv4-linklocal-01.txt" by the IETF). For example, in the case of DHCP, the printer 1001 tries to obtain the IP address via a DHCP client module (not shown) (step S2001). The DHCP client module is in an obtainment waiting mode for the IP address (S2002) until it recognizes that the IP address has properly and completely been obtained. If the completion of the obtainment of the IP address is recognized in S2002, the DHCP client module notifies the TCP/UDP/IP protocol stack unit 7 of it. If the TCP/UDP/IP protocol stack unit 7 determines the completion of the obtainment of the IP address, the processing routine advances to S2003.

In the embodiment, it is assumed that the IP address has variably been allocated by using a predetermined protocol such as an ARP protocol or the like.

The GENA processing unit 10 in the printer 1001 as a network corresponding type device which has obtained the IP address and participated in the network subsequently issues a Notify packet in a format of ssdp:alive in order to notify other devices existing on the network of device attribute information (S2003).

FIG. 3 is a diagram showing a packet format of Notifyssdp: alive. FIG. 4 is a diagram showing a packet format of Notifyssdp:byebye. The protocol which is used for notification of the device attribute information uses GENA (General Event Notification Architecture) specified by Universal Plug and Play Architecture 1.0 and issues an HTTPNotify packet in the format shown in FIG. 3 in response to a multicast address 239. 255. 255. 250 and a port number 1900. Specifically speaking, XML is used for description of an entity body of the HTTP-Notify packet and the attribute information of the device is notified when the packet is issued. As shown in FIG. 3, the format in this instance is described in a tag using DeviceInfo as a root element and attribute information corresponding to the following elements is described as element contents.

PrinterMakeAndModel: printer vendor*product name
PrinterName: printer name
PrinterURL: printer URL
PrinterMACAddress: printer physical address
PrinterUUID: printer Universal Unique ID ssdp:alive is described in an NTS header of the packet and it is possible to notify other network devices that the device has participated in the network. There is a maxage header in the packet and the term of validity of the device information sent from the printer to the network has been described on a second unit basis. So long as the device serving as an issuing source side of the packet is in an active mode on the network, that is, a mode in which execution of a job is accepted, the GENA processing unit 10 discriminates whether the term of validity specified in this header has expired or not (S2004). If it is determined in S2004 that the term of validity has expired, the printer transmits the same packet as the packet shown in FIG. 3 in a multicasting manner (S2003). If it is determined that the term of validity does not expire, the SSDP request is received by the TCP/UDP/IP protocol stack unit 7. The SSDP processing unit 9 obtains the SSDP request via the HTTP unit 8 (S2005). In S2005, if there is a change in information transmitted before at this time, similarly, it is possible to update the changed attribute information in XML and subsequently transmit it. If the SSDP processing unit 9 obtains the SSDP request from another printer in the active mode on the network, that is, in the mode in which the execution of the job is accepted, the SSDP processing unit 9 executes a process for analyzing the received request (S2006) and, thereafter, issues a response (S2007). Details of the process in the analyzing and issuing step will be explained hereinlater with reference to FIG. 6 and the like.

Subsequently, if the TCP/UDP/IP protocol stack unit 7 determines that the received information is not the SSDP request in S2005, whether it is a print job or not is discriminated in S2008. If the TCP/UDP/IP protocol stack unit 7 determines in S2008 that the received information is the print job, the printer 1001 executes the job in S2009 and S2010 follows. If the print job is not received in S2008, whether the network connection has been stopped or not is discriminated (S2010). If it is not stopped, the processing routine is returned to S2004 and the subsequent processes are repetitively executed. If the printer 1001 is in the network connection stop mode in S2010, the GENA processing unit 10 designates ssdp:byebye into the NTS header as shown in FIG. 4 and transmits the HTTPNotify packet in a multicasting manner (S2011). That is, the device repeats the above processes until the network connection is stopped.

Figure 5:
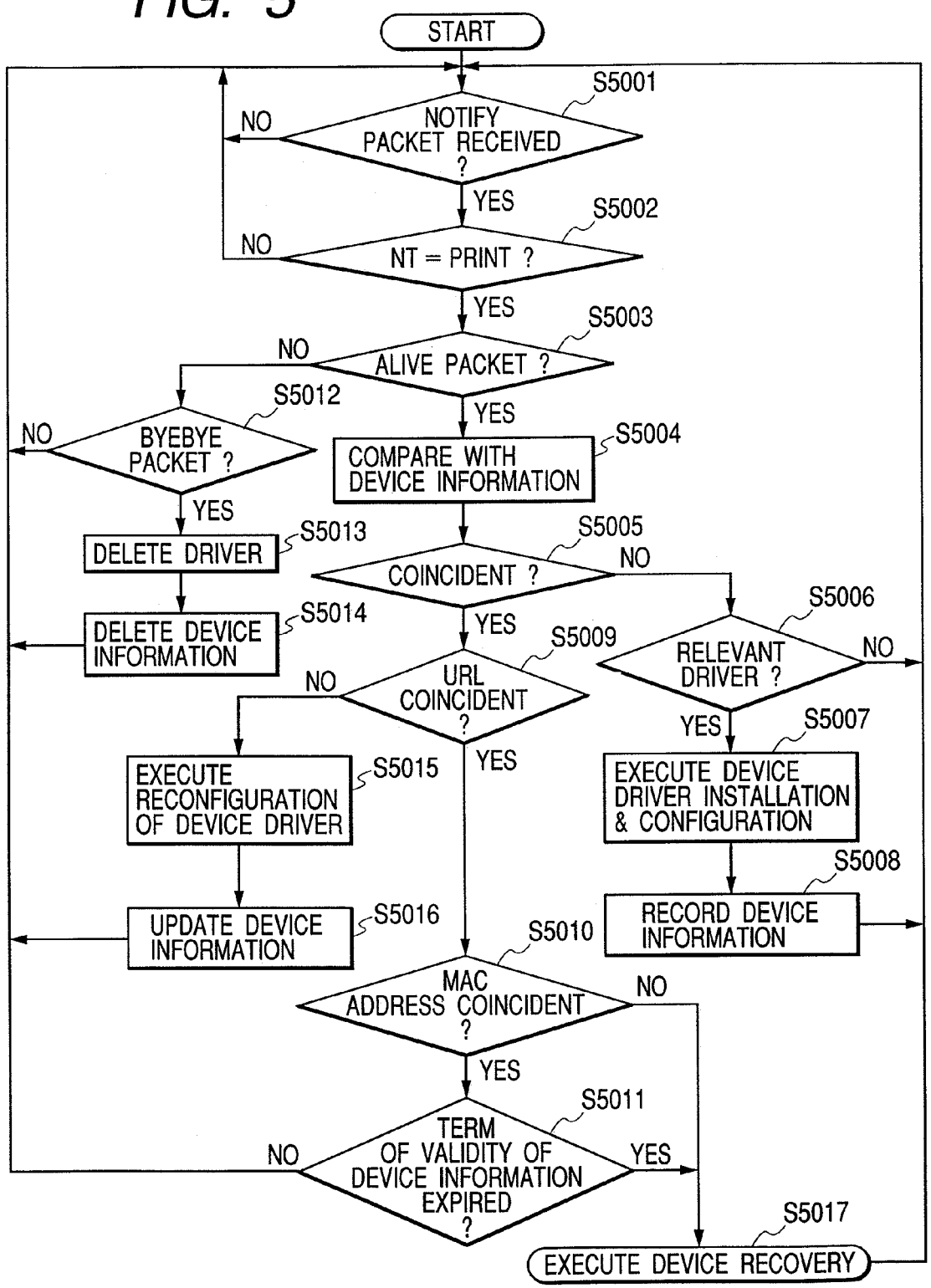
FIG. 5 is a flowchart showing a control flow for a client device.

FIG. 5 shows a control flow for a client device 1000 in the embodiment. When the client device 1000 is activated, processes in FIG. 5 are started and the system enters a mode for waiting for reception of the Notify packet (S5001). If the HTTP unit 3 in the client device 1000 determines in S5001 that the HTTPNotify packet mentioned above was obtained from the printer as a network corresponding type device, S5002 follows. An NT header in the HTTP packet is analyzed and whether it indicates NT designation other than Print or not is discriminated. If the HTTP unit 3 in the client device determines in S5002 that the NT header of the obtained Notify packet is not Print, this packet is ignored. The processing routine is returned to S5001 and the next packet is received. If it is determined in S5002 that the contents of the header indicate Print, S5003 follows and the HTTP unit 3 discriminates whether the NTS header of the packet is ssdp: alive or not.

If it is determined in S5003 that the NTS header is ssdp: alive, S5004 follows. The XML processing unit 4 subsequently analyzes an XML message in an entity body portion of the packet and notifies the Automatic Driver Configurator processing unit 1 of the obtained information. The Automatic Driver Configurator processing unit 1 manages contents of PrinterURL, PrinterMACAddress, and PrinterUUID as arguments of notified DeviceInfo as a list. In S5004, the Automatic Driver Configurator processing unit 1 checks PrinterURL, PrinterMACAddress, and PrinterUUID as arguments DeviceInfo, compares them with the device list information which is managed by the client device and has been recorded in the recording apparatus, and executes an analyzing process. Although identification information which is variably added to the printer and used for communication, for example, what is called URL which is managed by DNS can be described in PrinterURL, an IP address which is managed by a protocol such as AUTOIP or the like and added can be also allocated. The variable identification information is generally identification information such that identification information which is not used any more in a certain apparatus is added to another apparatus and can be used again.

If the HTTP unit 3 determines in S5003 that the Notify packet is not the alive packet, S5012 follows. In S5012, the HTTP unit 3 discriminates whether the Notify packet is the ByeBye packet or not. If the HTTP unit 3 determines in S5012 that the Notify packet is the ByeBye packet, the XML processing unit 4 analyzes such a packet and notifies the Automatic Driver Configurator processing unit 1 of it. The Automatic Driver Configurator processing unit 1 controls the installer in the system so as to compare the received device information with the device information recorded by the client device, specify the relevant driver, and execute uninstallation (S5013). Further, it controls a process for deleting the device information from the device recording information (S5014).

If the Automatic Driver Configurator processing unit 1 as an example of discriminating means determines in S5005 that the received device information does not coincide with the information of either the MAC address or the URL which are managed by the Automatic Driver Configurator processing unit 1, the Automatic Driver Configurator processing unit 1 determines that the device is a device which newly participated in the network, and S5006 follows. In S5006, the automatic driver setting module 1 discriminates whether the driver corresponding to the device which has been determined to be newly participated in the network has been recorded in the recording apparatus which is managed and controlled by the client device or not. If it is decided that such a driver does not exist, the Automatic Driver Configurator processing unit 1 does not execute the installing process but the processing routine is returned to S5001. In this instance, by using API, the Automatic Driver Configurator processing unit 1 can control a process for allowing a module of an OS or an application to display a warning message showing that the driver is not installed onto a display of the client device. If the Automatic Driver Configurator processing unit determines in S5006 that the driver corresponding to the new device exists, S5007 follows and the installation of such a driver is executed. Further, IP address information described in the received SOAP message, that is, PrinterURL is inputted to a driver module or a communication module of the OS, and the configuration of the driver is executed.

After the execution of the configuration process in S5007, the Automatic Driver Configurator processing unit 1 records the received device information into the recording apparatus which is managed by the client device and manages it (S5008). The system waits for reception of the next Notify packet (S5001).

In S5005, the Automatic Driver Configurator processing unit 1 analyzes device list information which has been recorded in the recording apparatus which is managed by the client device and includes the MAC address and URL and the device information including the MAC address and URL added to the received Notify packet and compares them, thereby discriminating. As a result of the comparison between the device information with the device list information recorded in the recording apparatus which is managed by the client device in S5005, if either PrinterMACAddress of the device or PrinterURL coincides with the recording information which is managed by the Automatic Driver Configurator processing unit 1, the processing routine advances to S5009.

If the Automatic Driver Configurator processing unit 1 determines in S5009 that PrinterURL does not coincide with the recording information which is managed by the Automatic Driver Configurator processing unit 1 serving as managing means, the Automatic Driver Configurator processing unit 1 decides that the URL (IP address) has been changed although the driver software of such a device has already been installed, so that the processing routine advances to S5015. In this case, the Automatic Driver setting module 1 in the client device 1000 executes the change in configuration of the installed driver on the basis of the received URL information (S5015). After that, the device recording information is updated and recorded into the recording apparatus (S5016). The processing routine is returned to S5001.

As a result of the comparison with the device list information recorded in the recording apparatus which is managed by the client device in S5009, if it is determined that PrinterURL of the device coincides with the recording information, S5010 follows. Whether PrinterMACAddress obtained from the apparatus determined in a manner such that PrinterURL of the device coincides with the recording information coincides with the recording information or not is discriminated in S5010. If it is determined in S5010 that PrinterMACAddress does not coincide with the recording information, S5017 follows. In this case, the Automatic Driver setting module 1 determines that another device different from the device in which the driver has already been installed has obtained the URL and newly participated in the network. The situation of S5010-"No" can occur in the case where an existing device is disconnected from the network although the existing device has not issued the HTTPNotify:ByeBye packet, or in the case where the printer, as a new device, obtains the URL which was used by an existing device that issued the HTTPNotify:ByeBye packet and issues the Notify packet, before an existing device receives the HTTPNotify:ByeBye packet.

In S5017, the client device executes discovery of the device in accordance with a flow shown in FIG. 6, which will be explained hereinlater. If it is determined in S5010 that the MAC address managed by the Automatic Driver Configurator processing unit 1 coincides with the MAC address newly obtained by the HTTP unit 3 via the TCP/UDP/IP protocol stack unit, S5011 follows. In S5011, the HTTP unit 3 discriminates whether the term of validity of the device information has expired or not. If it is determined that the term of validity has expired, the device discovery is executed (S5017). If it is determined that the term of validity does not expire, the processing routine is returned to S5001.

As a protocol which is used in the search in S5017, for example, SSDP (Simple Service Discovery Protocol) specified by Universal Plug and Play Architecture 1.0 is used. The client device issues an HTTP packet in which UUID of the device serving as a search target has been set in the ST header as Printer UUID recorded in the device list information as shown in FIG. 7 in response to the multicast address 239. 255. 255. 250 and the port number 1900 (S6001 in FIG. 6).

As described above, since the processes in S5009 and subsequent steps are executed in response to the obtainment of the Notify packet by the Automatic Driver Configurator processing unit 1 from the external peripheral device in S5001, even if the construction of the network changes dynamically, the control program for controlling each device can be properly installed into the client device. For example, in response to the participation of the device in the network, the setting of the driver can be properly and dynamically changed or the proper driver can be properly installed.

Figure 6:
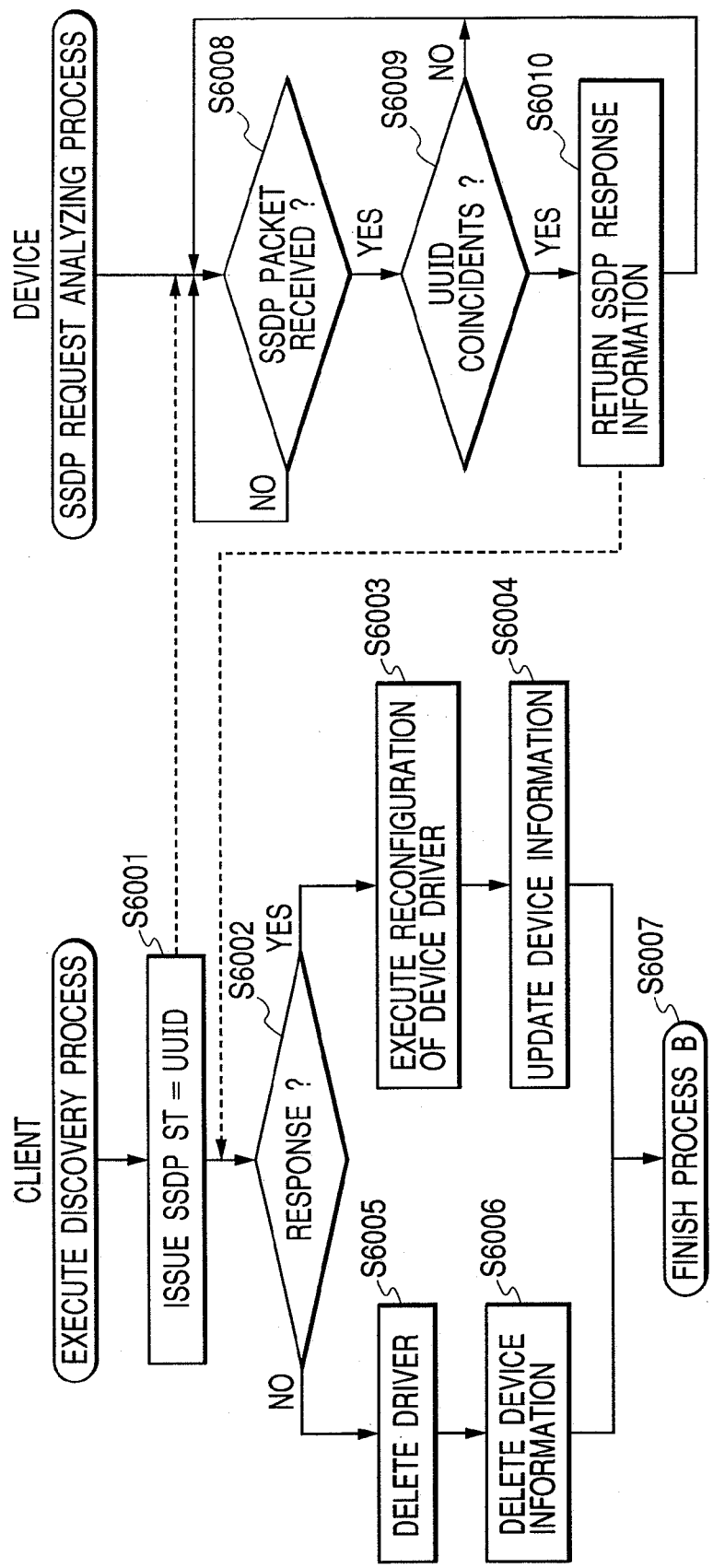
FIG. 6 is a flowchart showing a control flow for a device discovery.

FIG. 6 is a flowchart showing a discovery process which is executed on the client device side and the network device side. Steps S6001 to S6007 denote processes on the client side and steps S6008 to S6010 denote processes on the network device side. When a power source of the network device is turned on and the network device is connected to the network, the HTTP unit is activated and the processes are started from S6008 in FIG. 6. In S6008, the HTTP unit discriminates whether the SSDP packet has been obtained into the HTTP unit or not.

As for the client, first, as mentioned above, the HTTP unit 3 of the client device inserts the UUID into the ST header and transmits it to the network device in S6001.

If the HTTP unit 8 determines in S6008 that the SSDP packet has been obtained, S6009 follows. In S6009, first, the HTTP Unit 8 analyzes the ST header in the HTTP packet transmitted from the client device in the process in S6001. If the UUID designated by the ST header does not coincide with its own UUID, the process is interrupted, the received packet is ignored, and the system waits until the new SSDP packet is obtained in S6008 (S6008).

If the HTTP unit 8 determines in S6009 that the contents of the header obtained in S6008 coincide with its own UUID, the SSDP processing unit 9 returns an SSDP response to the client device which issued the HTTP packet (S6010). The processing routine is returned to S6008. The attribute information is described into an entity portion of the SSDP response in the same format as that shown in FIG. 3 and the packet in which the URL of the client device is set into the value of a HOST header is transmitted in a unicasting manner via the TCP/UDP/IP processing unit (S6010).

If a response of ssdp:alive is made by the printer 1001 when the HTTP unit 3 in the client device is waiting for the response from the printer (S6002), the client computer 1000 changes the configuration of the installed driver in accordance with the received information (S6003), thereafter, updates the device recording information, records it into the recording apparatus (S6004), and finishes the discovery process.

If no response is made by the device in S6002, it means that the corresponding device does not exist on the network. Therefore, the client device executes uninstallation of the installed driver (S6005), deletes the device information from the device recording information (S6006), and finishes the discovery process.

It is preferable that the client device checks maxage of each device information from the device recording information recorded in the recording apparatus and if the updated information cannot be received from the device even after the elapse of the maxage, the device discovery process is similarly executed.

Figure 8:
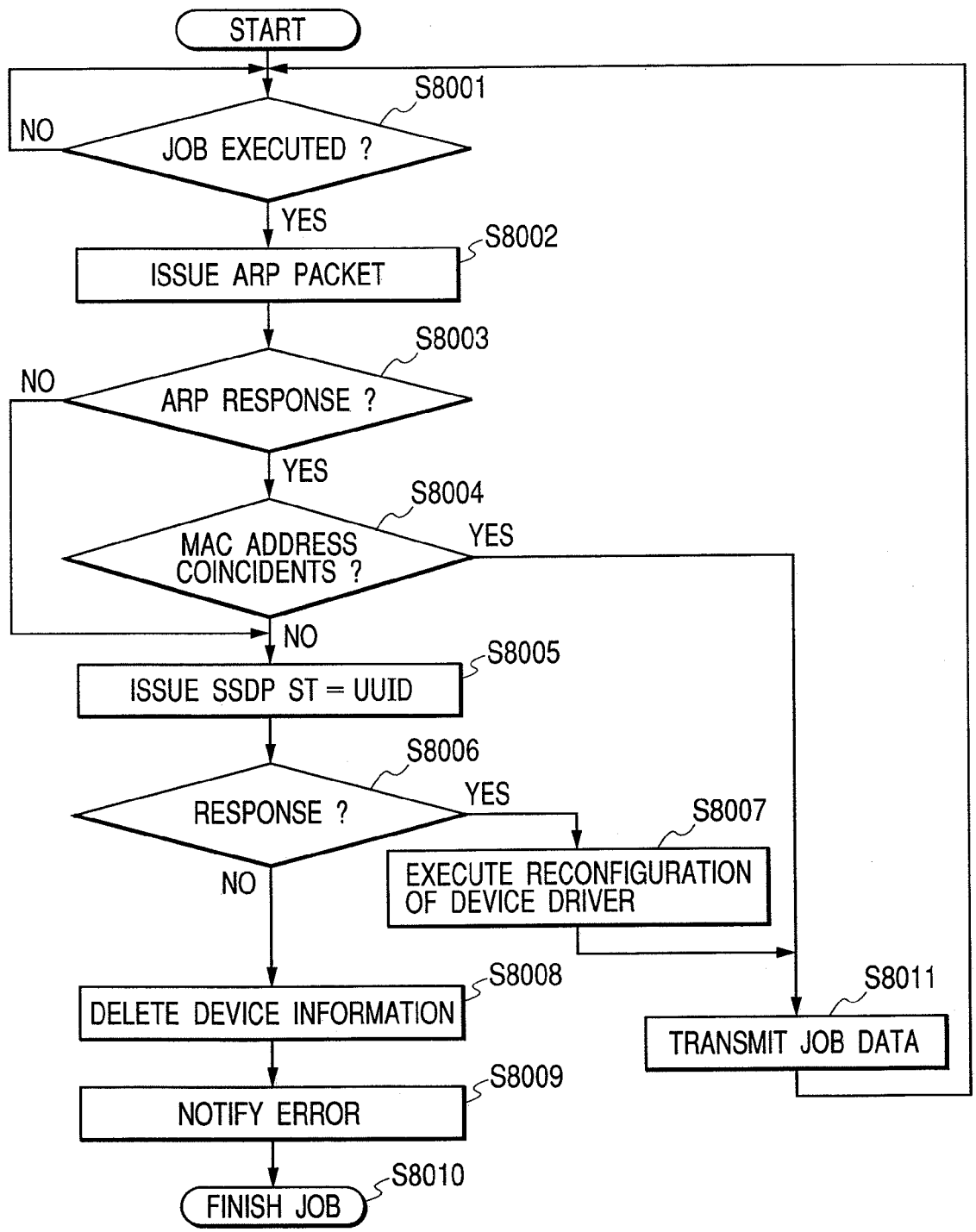
FIG. 8 is a flowchart showing a control flow which is executed when a client device job is issued.

FIG. 8 shows a control flow which is executed when a job is issued from the client device and is a flowchart showing a control flow for the device. In S8001, a port monitor (not shown) monitors whether the job has been executed or not, and the apparatus enters a waiting mode.

For example, if the port monitor determines that a job request for printing a document made by general software such as a word processor or the like has been made, the processing routine advances to S8002. In S8002, the ARP processing unit 14 issues an ARP (Address Resolution Protocol) packet in response to the URL of the device designated when the execution of the job is instructed, and S8003 follows. In S8003, the ARP processing unit 14 waits for an ARP response. In S8003, if the designated device exists on the network, the MAC address is returned as a response to the ARP packet. Therefore, if the ARP processing unit 14 recognizes the ARP response, the processing routine advances to S8004. The returned MAC address is obtained by the ARP processing unit 14 here. The Automatic Driver Configurator processing unit 1 obtains it from the ARP processing unit 14.

In S8004, the Automatic Driver Configurator processing unit 1 compares: PrinterMACAddress of the designated device in the device list information which is managed by the Automatic Driver Configurator processing unit 1 and has been recorded in the recording apparatus; and the MAC address obtained as an ARP response by the Automatic Driver Configurator processing unit 1 via the ARP processing unit 14. If the MAC address coincides with the device list information in S8004, it means that the printer in which the Automatic Driver Configurator processing unit 1 has designated the job process coincides with the device which issued the ARP response. In this case, the job data is transmitted to the URL of the device and the job is executed (S8011). The apparatus waits for the execution of the next job.

If the Automatic Driver Configurator processing unit 1 determines in S8004 that the MAC address does not coincide, the client device executes the same processes as those shown in the flow in step S6001 and subsequent steps in FIG. 6 mentioned above, thereby executing the discovery of the device.

If the response of ssdp:alive is made by the printer 1001 when the HTTP unit 3 in the client device is waiting for the response from the printer (S8006), the client computer 1000 changes the configuration of the driver installed by the Automatic Driver Configurator processing unit 1 in accordance with the received information (S8007). Thereafter, the Automatic Driver Configurator processing unit 1 operates the API and controls the transmitting process of the job data (S8011).

If no response is made by the device in S8005, it means that the corresponding device does not exist on the network. The Automatic Driver Configurator processing unit 1 executes the uninstallation of the corresponding driver and the deleting and updating processes of the device information (S8008).

The Automatic Driver Configurator processing unit 1 notifies the apparatus of an error (S8009) and finishes the job process.

It is preferable that the client device checks the maxage of each device information from the device recording information recorded in the recording apparatus and if the updated information cannot be received from the device after the elapse of the maxage, the device discovery process is similarly executed.

The job executing processes as a feature of the invention are completed by a series of processing sequence mentioned above.

Although the embodiment has been shown and described on the assumption that the printer is the network device, the network device can be realized in any of a storage device such as a hard disk or the like, a scanner, a copying apparatus, and a device having their compound functions so long as it is an apparatus which can obtain the attribute information described in the embodiment via the communicating function.

In the embodiment, an expressing method of the HTTP entity can be realized by a unique schema according to XML (eXtensible Markup Language). The description of the entity can be also realized by description using binary data.

In the embodiment, when the attribute information of the network device is notified, the annexed information of the device has been transmitted in the format of XML to the entity of the HTTP packet. However, such notification can be also realized by newly defining the HTTP header and using notifying means in the form using such a header.

Although the example of using the HTTP/TCP/IP/UDP protocol has been shown in the embodiment, the embodiment does not depend on transporting means but it can be also realized in the case of using another general protocol or a unique protocol so long as it is possible to make notification of the attribute information of the service providing device and the communication for searching the service providing device.

In the invention, the client device side executes the installation and the uninstallation of the driver software on the basis of the Notify message issued from the network device. The application of the invention is not limited to the driver software but the invention can be applied to all network device control software which needs the network configuration.

Other Embodiments

The processes shown in FIGS. 2, 5, and 8 in the embodiment can be also executed by the client device 1000, printer 1001, or the like in accordance with a program which is installed from the outside. In such a case, the invention is applied to a case where an information group including the program is supplied to the host computer by a memory medium such as CD-ROM, flash memory, FD, or the like or from an external memory medium via the network.

Naturally, the objects of the invention are also accomplished by a method whereby the memory medium in which the program codes of the software for realizing the functions of the embodiments mentioned above have been recorded as mentioned above is supplied to a system or an apparatus or downloaded from an external server (not shown) and a computer (or a CPU or an MPU) of the system or the apparatus reads out the program codes stored in the memory medium and executes them.

In this case, the program codes read out from the memory medium realize the novel functions of the invention and the memory medium in which the program codes have been recorded constructs the invention. As a memory medium for supplying the program codes, for example, a floppy disk, a hard disk, an optical disk, a magnetooptic disk, a DVD, a CD-ROM, a magnetic tape, a non-volatile memory card, a ROM, an EEPROM, or the like can be used.

Naturally, the invention incorporates not only a case where a computer executes the read-out program codes, so that the functions of the embodiments mentioned above are realized but also a case where an OS (Operating System) or the like which is operating on the computer executes a part or all of actual processes on the basis of instructions of the program codes and the functions of the embodiments mentioned above are realized by those processes. Further, naturally, the invention incorporates a case where the program codes read out from the memory medium are written into a memory provided for a function expanding board inserted into a computer or a function expanding unit connected to a computer, thereafter, a CPU or the like provided for the function expanding board or the function expanding unit executes a part or all of actual processes on the basis of the instructions of the program codes and the functions of the embodiments mentioned above are realized by those processes.

As described above, according to the invention, when the network corresponding type device is used, it is possible to provide the system which enables the user to set a change in network configuration setting or the like such as application software, utility software, driver software, or the like in order to use the network corresponding type device installed in the client device without being aware of it.

What is claimed is:

1. An information processing apparatus which can communicate via a network with an external information processing apparatus which issues a disconnection notification based on a disconnection from the network, the information processing apparatus comprising:
    managing means for managing fixed identification information added to the external information processing apparatus and variable identification information added to the external information processing apparatus;
    obtaining means for obtaining the fixed identification information and the variable identification information from the external information processing apparatus;
    discriminating means for discriminating whether the variable identification information obtained by said obtaining means coincides with the variable identification information managed by said managing means and whether the fixed identification information obtained by said obtaining means coincides with the fixed identification information managed by said managing means; and
    setting means for, if said discriminating means discriminates that the fixed identification information obtained by said obtaining means coincides with the fixed identification information managed by said managing means and the variable identification information obtained by said obtaining means does not coincide with the variable identification information managed by said managing means, setting the variable identification information obtained by said obtaining means in a control program that controls the external information processing apparatus having the fixed identification information.

2. An information processing apparatus according to claim 1, wherein said managing means manages, in the form of a list, the fixed identification information and variable identification information of the external information processing apparatus, which is capable of communication via the network; and
    wherein said discriminating means performs the discrimination by discriminating whether or not the variable identification information and fixed identification information obtained by said obtaining means exists in the list in response to the obtainment of the fixed identification information and variable identification information of the external information processing apparatus by said obtaining means.

3. An information processing apparatus according to claim 1, wherein said obtaining means obtains the fixed identification information and the variable identification information from the external information processing apparatus by sending a search request to the external information processing apparatus; and
    wherein said information processing apparatus further comprises job control means for controlling job processing such that a job execution request is sent to the external information processing apparatus after the setting by said setting means, (i) if said obtaining means obtains a response to the search request from the external information processing apparatus and (ii) if said discriminating means discriminates that, although the fixed identification information included in the response obtained by said obtaining means coincides with the fixed identification information managed by said managing means, the variable identification information included in the obtained response does not coincide with the variable identification information managed by said managing means, and such that the job execution request is not sent to the external information processing apparatus, if said obtaining means does not obtain a response to the search request from the external information processing apparatus.

4. An information processing apparatus according to claim 3, wherein the search request includes fixed identification information and variable identification information, wherein if fixed identification information or variable identification information of the external information processing apparatus coincides with the fixed identification information or the variable identification information included in the search request, the external information processing apparatus sends the response including the fixed identification information or the variable identification information of the external information processing apparatus to the search request, and wherein said obtaining means waits until the response to the search request is received.

5. An information processing apparatus according to claim 1, wherein the fixed identification information comprises a MAC address and the variable identification information comprises an IP address.

6. A method in an information processing apparatus which can communicate via a network with an external information processing apparatus which issues a disconnection notification based on a disconnection from the network, said method comprising:
    a managing step of managing fixed identification information added to the external information processing apparatus and variable identification information added to the external information processing apparatus;
    an obtaining step of obtaining the fixed identification information and the variable identification information from the external information processing apparatus;
    a discriminating step of discriminating whether the variable identification information obtained in said obtaining step coincides with the variable identification information managed in said managing step and whether the fixed identification information obtained in said obtaining step coincides with the fixed identification information managed in said managing step; and setting means for, if said discriminating step discriminates that the fixed identification information obtained in said obtaining step coincides with the fixed identification information managed in said managing step and the variable identification information obtained in said obtaining step does not coincide with the variable identification information managed in said managing step, setting the variable identification information obtained in said obtaining step in a control program that controls the external information processing apparatus having the fixed identification information.

7. A method according to claim 6, wherein said managing step manages, in the form of a list, the fixed identification information and variable identification information of the external information processing apparatus, which is capable of communication via the network; and wherein said discriminating step performs the discrimination by discriminating whether or not the variable identification information and fixed identification information obtained in said obtaining step exists in the list in response to the obtainment of the fixed identification information and variable identification information of the external information processing apparatus in said obtaining step.

8. A method according to claim 6, wherein said obtaining step obtains the fixed identification information and the variable identification information from the external information processing apparatus by sending a search request to the external information processing apparatus; and wherein said method further comprises a job control step of controlling job processing such that a job execution request is sent to the external information processing apparatus after the setting in said setting step, (i) if said obtaining step obtains a response to the search request from the external information processing apparatus and (ii) if said discriminating step discriminates that, although the fixed identification information included in the response obtained in said obtaining step coincides with the fixed identification information managed in said managing step, the variable identification information included in the obtained response does not coincide with the variable identification information managed in said managing step, and such that the job execution request is not sent to the external information processing apparatus, if said obtaining step does not obtain a response to the search request from the external information processing apparatus.

9. A method according to claim 8, wherein the search request includes fixed identification information and variable identification information, wherein if fixed identification information or variable identification information of the external information processing apparatus coincides with the fixed identification information or the variable identification information included in the search request, the external information processing apparatus sends the response including the fixed identification information or the variable identification information of the external information processing apparatus to the search request, and wherein said obtaining step waits until the response to the search request is received.

10. An information processing apparatus according to claim 6, wherein the fixed identification information comprises a MAC address and the variable identification information comprises an IP address.

11. A non-transitory computer-readable storage medium storing a computer program that is executed in an information processing apparatus which can communicate via a network with an external information processing apparatus which issues a disconnection notification based on a disconnection from the network, wherein said program allows the information processing apparatus to execute:

a managing step of managing fixed identification information added to the external information processing apparatus and variable identification information added to the external information processing apparatus;

an obtaining step of obtaining the fixed identification information and the variable identification information from the external information processing apparatus;

a discriminating step of discriminating whether the variable identification information obtained in said obtaining step coincides with the variable identification information managed in said managing step and whether the fixed identification information obtained in said obtaining step coincides with the fixed identification information managed in said managing step; and a setting step of, if said discriminating step discriminates that the fixed identification information obtained in said obtaining step coincides with the fixed identification information managed in said managing step and the variable identification information obtained in said obtaining step does not coincide with the variable identification information managed in said managing step, setting the variable identification information obtained in said obtaining step in a control program that controls the external information processing apparatus having the fixed identification information.

\* \* \* \* \*